(12) United States Patent
Beedu et al.

(10) Patent No.: US 10,902,324 B2
(45) Date of Patent: Jan. 26, 2021

(54) DYNAMIC DATA SNAPSHOT MANAGEMENT USING PREDICTIVE MODELING

(71) Applicant: Nutanix, Inc., San Jose, CA (US)

(72) Inventors: Bharat Kumar Beedu, Santa Clara, CA (US); Abhinay Nagpal, San Jose, CA (US); Himanshu Shukla, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 933 days.

(21) Appl. No.: 15/181,094

(22) Filed: Jun. 13, 2016

(65) Prior Publication Data

US 2020/0034718 A1 Jan. 30, 2020

(51) Int. Cl.
  *G06N 5/02* (2006.01)
  *G06F 3/06* (2006.01)
  *G06F 16/27* (2019.01)

(52) U.S. Cl.
  CPC .............. *G06N 5/02* (2013.01); *G06F 3/061* (2013.01); *G06F 3/0644* (2013.01); *G06F 3/0673* (2013.01); *G06F 16/27* (2019.01)

(58) Field of Classification Search
  CPC .......... G06N 5/092; G06N 5/02; G06N 20/00; G06N 5/003; G06F 16/27; G06F 3/061; G06F 3/0644; G06F 3/0673
  See application file for complete search history.

(56) References Cited

U.S. PATENT DOCUMENTS

| | | |
|---|---|---|
| 7,953,843 B2 | 5/2011 | Cherkasova |
| 8,060,599 B2 | 11/2011 | Cherkasova et al. |
| 8,104,041 B2 | 1/2012 | Belady et al. |
| 8,291,411 B2 | 10/2012 | Beaty et al. |
| 8,326,970 B2 | 12/2012 | Cherkasova et al. |
| 8,464,254 B1 | 6/2013 | Vohra et al. |
| 8,533,222 B2 | 9/2013 | Breckenridge et al. |
| 8,549,518 B1 | 10/2013 | Aron et al. |
| 8,560,671 B1 | 10/2013 | Yahalom et al. |
| 8,601,473 B1 | 12/2013 | Aron et al. |

(Continued)

OTHER PUBLICATIONS

Notice of Allowance dated Dec. 31, 2018 for related U.S. Appl. No. 15/191,387, 8 pages.

(Continued)

*Primary Examiner* — Robert A Cassity
*Assistant Examiner* — Brent Johnston Hoover
(74) *Attorney, Agent, or Firm* — Vista IP Law Group, LLP

(57) ABSTRACT

Systems for distributed data storage. A method embodiment commences upon capturing a history of storage I/O activity over a recent time period. A predictive model is derived from the captured storage I/O activity, and the predictive model is then used for predicting future storage I/O activity. A set of snapshot planning parameters comprising objectives (e.g., to minimize costs or to maximize likelihood completing a snapshot activity by a prescribed time) and/or constraints (e.g., don't wait more than one day to start a snapshot) are applied to the predicted storage I/O characteristics to generate a set of feasible snapshot plans. One of the feasible snapshot plans is selected for scheduling so as to begin the planned snapshot activity at a prescribed time. The snapshot planning parameters are normalized based on the predicted storage I/O characteristics.

22 Claims, 11 Drawing Sheets

(56) References Cited

U.S. PATENT DOCUMENTS

| | | | |
|---|---|---|---|
| 8,626,902 B2 | 1/2014 | Singh et al. | |
| 8,850,130 B1 * | 9/2014 | Aron | G06F 9/52 |
| | | | 711/150 |
| 8,863,124 B1 | 10/2014 | Aron | |
| 8,997,097 B1 | 3/2015 | Aron et al. | |
| 9,015,122 B2 | 4/2015 | Harrison et al. | |
| 9,032,077 B1 | 5/2015 | Klein et al. | |
| 9,047,083 B2 | 6/2015 | Gupta et al. | |
| 9,052,936 B1 | 6/2015 | Aron et al. | |
| 9,083,581 B1 | 7/2015 | Addepalli et al. | |
| 9,152,643 B2 | 10/2015 | Whitehead et al. | |
| 9,154,589 B1 | 10/2015 | Klein et al. | |
| 9,210,100 B2 | 12/2015 | Van Der et al. | |
| 9,256,374 B1 | 2/2016 | Aron et al. | |
| 9,256,475 B1 | 2/2016 | Aron et al. | |
| 9,317,223 B2 | 4/2016 | Reohr et al. | |
| 9,336,031 B2 | 5/2016 | Hackett et al. | |
| 9,354,912 B1 | 5/2016 | Aron et al. | |
| 9,389,887 B1 | 7/2016 | Aron et al. | |
| 9,405,569 B2 | 8/2016 | Greden et al. | |
| 9,417,903 B2 | 8/2016 | Bello et al. | |
| 9,552,259 B1 * | 1/2017 | Chopra | G06F 11/1461 |
| 9,563,697 B1 | 2/2017 | Caplan | |
| 9,575,784 B1 | 2/2017 | Aron et al. | |
| 9,595,054 B2 | 3/2017 | Jain et al. | |
| 9,619,257 B1 | 4/2017 | Aron et al. | |
| 9,619,261 B2 | 4/2017 | Gaurav et al. | |
| 9,626,275 B1 | 4/2017 | Hitchcock et al. | |
| 9,639,426 B2 * | 5/2017 | Pawar | G06F 16/128 |
| 9,641,385 B1 | 5/2017 | Daniel et al. | |
| 9,665,386 B2 | 5/2017 | Bayapuneni et al. | |
| 9,705,817 B2 | 7/2017 | Lui et al. | |
| 9,772,866 B1 | 9/2017 | Aron et al. | |
| 9,817,719 B2 | 11/2017 | Dain et al. | |
| 9,836,229 B2 | 12/2017 | D'sa et al. | |
| 9,842,153 B2 | 12/2017 | Bishop | |
| 9,882,969 B2 | 1/2018 | Reddy et al. | |
| 9,886,215 B1 | 2/2018 | Ramachandran et al. | |
| 9,933,979 B2 | 4/2018 | Gu et al. | |
| 9,959,188 B1 | 5/2018 | Krishnan | |
| 9,961,017 B2 | 5/2018 | Jacob et al. | |
| 10,067,722 B2 | 9/2018 | Lakshman | |
| 10,127,234 B1 | 11/2018 | Krishnan et al. | |
| 10,296,494 B2 | 5/2019 | Davis et al. | |
| 10,402,733 B1 | 9/2019 | Li et al. | |
| 2004/0205206 A1 | 10/2004 | Naik et al. | |
| 2006/0010101 A1 | 1/2006 | Suzuki et al. | |
| 2006/0053262 A1 * | 3/2006 | Prahlad | G06F 3/0605 |
| | | | 711/162 |
| 2006/0218551 A1 | 9/2006 | Berstis et al. | |
| 2006/0224823 A1 | 10/2006 | Morley et al. | |
| 2006/0288346 A1 | 12/2006 | Santos et al. | |
| 2007/0136402 A1 | 6/2007 | Grose et al. | |
| 2008/0005468 A1 | 1/2008 | Faibish et al. | |
| 2008/0147934 A1 | 6/2008 | Nonaka et al. | |
| 2008/0295096 A1 | 11/2008 | Beaty et al. | |
| 2008/0320482 A1 | 12/2008 | Dawson et al. | |
| 2009/0030864 A1 | 1/2009 | Pednault et al. | |
| 2009/0287747 A1 * | 11/2009 | Zane | G06F 16/2471 |
| 2009/0288084 A1 | 11/2009 | Astete et al. | |
| 2009/0319582 A1 * | 12/2009 | Simek | G06F 11/1469 |
| 2010/0083248 A1 | 4/2010 | Wood et al. | |
| 2010/0121828 A1 | 5/2010 | Wang | |
| 2010/0217651 A1 | 8/2010 | Crabtree et al. | |
| 2010/0275058 A1 | 10/2010 | Hashimoto et al. | |
| 2011/0185355 A1 | 7/2011 | Chawla et al. | |
| 2011/0202657 A1 | 8/2011 | Chang et al. | |
| 2012/0041914 A1 | 2/2012 | Tirunagari | |
| 2012/0109619 A1 | 5/2012 | Gmach et al. | |
| 2012/0278275 A1 | 11/2012 | Danciu et al. | |
| 2013/0054910 A1 * | 2/2013 | Vaghani | G06F 3/061 |
| | | | 711/162 |
| 2013/0086341 A1 | 4/2013 | Vasavi et al. | |
| 2013/0139152 A1 | 5/2013 | Chang et al. | |
| 2013/0174152 A1 | 7/2013 | Yu | |
| 2013/0185718 A1 | 7/2013 | S. M. et al. | |
| 2013/0283097 A1 | 10/2013 | Chen et al. | |
| 2014/0082614 A1 | 3/2014 | Klein et al. | |
| 2014/0157260 A1 | 6/2014 | Balani et al. | |
| 2014/0279784 A1 | 9/2014 | Casalaina et al. | |
| 2014/0282525 A1 | 9/2014 | Sapuram et al. | |
| 2014/0289268 A1 | 9/2014 | Patil et al. | |
| 2014/0344453 A1 | 11/2014 | Varney et al. | |
| 2015/0033224 A1 | 1/2015 | Maheshwari et al. | |
| 2015/0106578 A1 | 4/2015 | Warfield et al. | |
| 2015/0169291 A1 | 6/2015 | Dube et al. | |
| 2015/0234869 A1 | 8/2015 | Chan et al. | |
| 2015/0339572 A1 | 11/2015 | Achin et al. | |
| 2015/0341223 A1 | 11/2015 | Shen et al. | |
| 2015/0350102 A1 | 12/2015 | Leon-garcia et al. | |
| 2015/0379429 A1 | 12/2015 | Lee et al. | |
| 2016/0019094 A1 | 1/2016 | Habdank et al. | |
| 2016/0048337 A1 * | 2/2016 | Prahlad | G06F 3/0605 |
| | | | 711/170 |
| 2016/0048408 A1 | 2/2016 | Madhu et al. | |
| 2016/0203176 A1 | 7/2016 | Mills | |
| 2016/0224384 A1 | 8/2016 | Gokhale et al. | |
| 2016/0232450 A1 * | 8/2016 | Chen | G06F 11/00 |
| 2016/0300142 A1 | 10/2016 | Feller et al. | |
| 2016/0359955 A1 | 12/2016 | Gill et al. | |
| 2016/0364647 A1 | 12/2016 | Achin et al. | |
| 2016/0373377 A1 | 12/2016 | Cao et al. | |
| 2016/0379125 A1 | 12/2016 | Bordawekar et al. | |
| 2017/0031816 A1 | 2/2017 | Lee et al. | |
| 2017/0262520 A1 * | 9/2017 | Mitkar | G06F 16/275 |
| 2017/0364307 A1 | 12/2017 | Lomelino et al. | |
| 2017/0364387 A1 | 12/2017 | Ahmed et al. | |
| 2018/0046487 A1 | 2/2018 | Matters et al. | |
| 2018/0060134 A1 | 3/2018 | Bianchini et al. | |
| 2018/0225139 A1 | 8/2018 | Hahn et al. | |
| 2019/0146707 A1 | 5/2019 | Fetik | |

OTHER PUBLICATIONS

Final Office Action dated Feb. 15, 2019 for related U.S. Appl. No. 15/352,495, 22 pages.

Notice of Allowance dated Feb. 21, 2019 for related U.S. Appl. No. 15/283,004, 5 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

(56) References Cited

OTHER PUBLICATIONS

Non-Final Office Action dated Apr. 29, 2019 for U.S. Appl. No. 15/298,149, 10 pages.
Non-Final Office Action dated Sep. 6, 2018 for related U.S. Appl. No. 15/283,004, 5 pages.
Notice of Allowance dated Oct. 18, 2018 for related U.S. Appl. No. 15/298,149, 5 pages.
Advisory Action dated Nov. 1, 2018 for related U.S. Appl. No. 15/191,387, 3 pages.
Final Office Action dated Nov. 16, 2018 for related U.S. Appl. No. 15/351,388, 19 pages.
Wikipedia. "Feasible region". Nov. 16, 2015. 2 pages.
"What Is Multiobjective Optimization?" Feb. 16, 2015. 1 page. http://www.mathworks.com/help/gads/what-is-multiobjective-optimization.html.
Massimiliano Caramia et al. "Multi-objective Optimization". 2008. 27 pages. Chapter 2. Springer-Verlag London.
Nagpal et al., "STAY-FIT: Seasonal Time series Analysis and Forecasting using Tournament Selection", 3 pages; Nutanix, Inc., San Jose, CA. USA.
Dlessner, "STAY-FIT: Getting Ready for What Is Next in Prism", Nutanix, Inc., Dec. 8, 2015, 4 pages.
U.S. Appl. No. 15/006,435, filed Jan. 26, 2016, 65 pages.
U.S. Appl. No. 15/173,577, filed Jun. 3, 2016, 102 pages.
U.S. Appl. No. 15/191,387, filed Jun. 23, 2016, 59 pages.
Non-Final Office Action dated Mar. 22, 2018 for related U.S. Appl. No. 15/191,387.
Wikipedia. "Gittins index". Dec. 7, 2015. 6 pages.
Pandelis et al. "On the optimality of the Gittins index rule for multi-armed bandits with multiple plays". Jul. 1999. 13 pages.
Deel et al. "Linear Tape File System (LTFS) Format Specification". Dec. 21, 2013. 69 pages.
Non-Final Office Action dated Nov. 14, 2017 for U.S. Appl. No. 15/186,235.
Non-Final Office Action dated Nov. 27, 2017 for U.S. Appl. No. 15/160,246.
Final Office Action dated Mar. 30, 2018 for related U.S. Appl. No. 15/160,246.
Notice of Allowance dated May 16, 2018 for related U.S. Appl. No. 15/186,235.
Non-Final Office Action dated May 24, 2018 for related U.S. Appl. No. 15/351,388.
Non-Final Office Action dated Jun. 8, 2018 for related U.S. Appl. No. 15/298,149.
Non-Final Office Action dated Jun. 29, 2018 for related U.S. Appl. No. 15/352,495.
Mei et al., Performance Analysis of Network I/O Workload in Virtualized Data Centers, 2010, IEEE, pp. 1-16 (Year: 2010).
Paul et al., Performance Monitoring and Capacity Planning, 2006, VMWorld, pp. 1-39 Centers (Year: 2006).
Notice of Allowance dated Aug. 15, 2018 for related U.S. Appl. No. 15/160,246.
Final Office Action dated Aug. 15, 2018 for related U.S. Appl. No. 15/191,387.
U.S. Appl. No. 15/298,107, filed Oct. 19, 2016, 57 pages.
U.S. Appl. No. 15/341,549, filed Nov. 2, 2016, 90 pages.
U.S. Appl. No. 15/006,416, filed Jan. 26, 2016, 64 pages.
Notice of Allowance dated May 22, 2019 for U.S. Appl. No. 15/191,387.
Non-Final Office Action dated May 24, 2019 for related U.S. Appl. No. 15/251,244.
Notice of Allowance dated Jun. 5, 2019 for related U.S. Appl. No. 15/283,004.
Non-Final Office Action dated Jul. 5, 2019 for related U.S. Appl. No. 15/394,654.
Notice of Allowance dated Aug. 7, 2019 for related U.S. Appl. No. 15/283,004.
Final Office Action dated Aug. 16, 2019 for U.S. Appl. No. 15/298,149.
Notice of Allowance dated Feb. 13, 2020 for U.S. Appl. No. 15/298,149.
Advisory Action dated Oct. 30, 2019 for U.S. Appl. No. 15/298,149.
Final Office Action dated Jan. 7, 2020 for related U.S. Appl. No. 15/251,244.
Non-Final Office Action dated May 4, 2020 U.S. Appl. No. 16/237,450.
Final Office Action dated Sep. 4, 2020 for related U.S. Appl. No. 15/394,654.

\* cited by examiner

DYNAMIC DATA SNAPSHOT MANAGEMENT USING PREDICTIVE MODELING

FIELD

This disclosure relates to distributed data storage, and more particularly to techniques for performing dynamic data snapshot scheduling using predictive modeling.

BACKGROUND

The use of virtual machines (VMs) to improve the usage of computing resources continues to increase. The high storage I/O (input/output or IO) demands of such VMs has precipitated an increase in distributed storage systems. Today's distributed storage systems have evolved to comprise autonomous nodes that serve to facilitate incremental and/or linear scaling. One benefit of such distributed storage systems is the ability to distribute stored data throughout the nodes in a given cluster. With as many as several thousands of autonomous VMs per cluster, the storage IO activity in the distributed storage system can be highly dynamic. For example, the storage input/output activity can exhibit widely varying amounts of data movement at various times due to certain seasonalities, changes in activity levels of specific VMs, and/or other reasons. Many distributed storage systems might implement data snapshotting techniques to capture the state of stored data at a particular time. Such snapshots can serve as virtual and/or physical copies of various sets of data to facilitate compliance with various data management policies, such as pertaining to data backup policies, site replication, data retention, data restoration, disaster recovery (DR) and/or other aspects of data management. Such data management policies might further be characterized by one or more data management objectives. For example, a data management objective for a data restore policy might be to minimize the cost of taking snapshots so as to facilitate rapid restoration. In some situations, data management objectives might be subjected to a set of given constraints such as a maximum data management spending budget, a maximum storage allocation budget, a maximum quantity of data changes between restore points, and/or other constraints.

Unfortunately, legacy techniques for scheduling snapshots fail in their ability to satisfy data management objectives in a highly varying storage IO distributed storage environment. For example, legacy techniques might merely enable a site manager (e.g., an IT administrator) to select a static snapshot frequency (e.g., a number of snapshots to be taken over a given time period). For example, the data manager might choose to take a snapshot every 12 hours with the intent to achieve a data management objective of minimizing the cost of the snapshots, while remaining within certain spend, space, and/or maximum data change constraints. In this case, however, during periods of high storage IO activity resulting in large volumes of changed data, the snapshot frequency may be too low to satisfy the maximum data change constraint. If the snapshot frequency is increased to satisfy the maximum data change constraint, the spending and/or space budget constraint might be exceeded as the snapshots continue to be taken at the higher frequency during periods of low storage IO activity—even when the volume of changed data is low. Further, with such legacy approaches, the site manager has limited knowledge of and/or ability to discern the multivariate (e.g., cost, space, performance, data change levels, etc.) effects of choosing a certain snapshot frequency at the time the frequency is selected.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for dynamic data snapshot management using predictive modeling, which techniques advance the relevant technologies to address technological issues with legacy approaches. More specifically, the present disclosure provides a detailed description of techniques used in systems, methods, and in computer program products for performing dynamic data snapshot management using predictive modeling. Certain embodiments are directed to technological solutions for applying data management objectives to variable constraints derived from a predictive model to determine a dynamic snapshot plan. The disclosed embodiments modify and improve over legacy approaches. In particular, the herein-disclosed techniques provide technical solutions that address the technical problems attendant to determining a snapshot plan that satisfies one or more data management objectives in a highly varying distributed storage environment. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computer system performance optimization as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
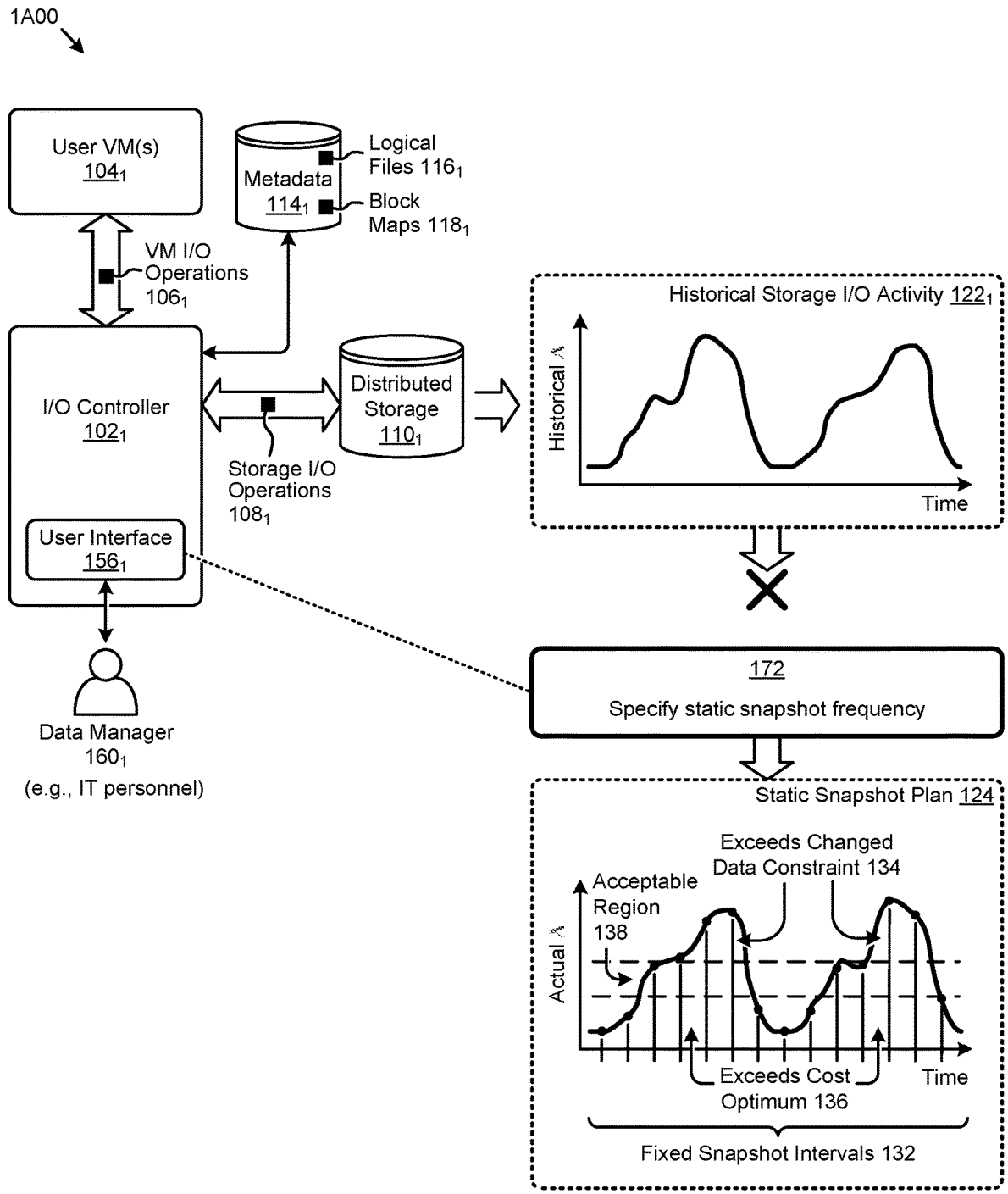
FIG. 1A presents a static snapshot scheduling technique.

Some embodiments of the present disclosure address the problem of determining a snapshot plan that satisfies one or more data management objectives in a highly varying storage IO distributed storage environment and some embodiments are directed to approaches for applying data management objectives to variable constraints derived from a predictive model to determine a dynamic snapshot plan. More particularly, disclosed herein and in the accompanying figures are exemplary environments, systems, methods, and computer program products for implementing dynamic data snapshot management using predictive modeling.

Overview

Disclosed herein are techniques for applying data management objectives to variable constraints derived from a predictive model to determine a dynamic snapshot plan for implementation in a distributed storage environment. In certain embodiments, a predictive model can be formed from historical storage input/output (I/O or IO) activity to generate predicted storage IO characteristics that can be applied to one or more objective functions and/or set of constraints to determine one or more dynamic snapshot plans. The dynamic snapshot plans can have snapshot intervals, storage locations, and/or other attributes that vary in time and/or other dimensions. The dynamic snapshot plans can further serve to optimize (e.g., minimize, maximize) values returned by the objective functions. In some embodiments, the dynamic snapshot plans can be updated in real time responsive to changes in the predicted storage IO characteristics, objective parameters, and/or constraint parameters electronically received from the distributed storage environment. In certain embodiments, a user interface can be provided to accept a set of objective and/or constraint parameters from a data manager, and/or present a set of recommended snapshot plans and/or associated metrics for selection by the data manager.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A presents a static snapshot scheduling technique 1A00. As an option, one or more variations of static snapshot scheduling technique 1A00 or any aspect thereof may be implemented in the context of the architecture and functionality of the embodiments described herein. The static snapshot scheduling technique 1A00 or any aspect thereof may be implemented in any environment.

Each node in a cluster of a distributed computing and storage system might have an IO controller $102_1$ that services a set of user VMs $104_1$. In some cases, the IO controller $102_1$ can also be a virtual machine. Certain instances of VM IO operations $106_1$ can be issued by the user VMs $104_1$ (e.g., through a hypervisor) to perform various computing and/or storage operations, such as storage IO operations $108_1$ (e.g., data read, data write, etc.). In some cases, the IO controller $102_1$ can issue instances of storage IO operations $108_1$ for various purposes, such as pertaining to snapshots, clones, and/or other functions. Data associated with each of the user VMs $104_1$ (e.g., user data, user data snapshots, VM clones, etc.) can be stored in a distributed storage $110_1$ as directed by the IO controller $102_1$.

In some cases, the distributed storage $110_1$ can comprise various physical storage devices (e.g., PCIe storage devices, SSD devices, HDD devices, etc.) that span multiple nodes in the cluster and/or remote storage facilities (e.g., cloud storage). For example, the IO controller $102_1$ might make a determination for a given instance of the storage IO operations $108_1$ (e.g., write command) as to which physical storage location to store the corresponding write data. Such distribution of data can be used to approach a uniform local storage capacity usage among the nodes in order to improve performance. The storage IO operations $108_1$ can precipitate certain storage activities that can be represented by various metrics. For example, as shown, a certain collection of historical storage IO activity $122_1$ might be represented by an amount of changed data (e.g., historical Δ) varying over time. The historical storage IO activity $122_1$ illustrates that the storage IO activity in the distributed storage system can be highly dynamic due certain seasonalities, activity of specific VMs, and/or other reasons.

As also shown, a set of metadata $114_1$ can hold virtual or logical representations of the data in a set of logical files $116_1$ (e.g., virtual disks or vDisks, etc.) to simplify data access by the user VMs $104_1$ and/or for other purposes. A set of block maps $118_1$ can further be stored in the metadata $114_1$ to map the logical files $116_1$ to their corresponding physical storage locations.

More information and approaches to implement virtual disks (vDisks) and use of any associated metadata is described in U.S. application Ser. No. 13/207,345, now issued as U.S. Pat. No. 8,601,473 and Ser. No. 13/207,357, now issued as U.S. Pat. No. 8,850,130, both filed on Aug. 10, 2011 and both of which are hereby incorporated by reference in their entirety.

In some cases, the metadata $114_1$ can facilitate snapshotting in the distributed computing and storage system. As an example, such snapshots can serve as virtual and/or physical copies of certain sets of data to facilitate compliance with various data management policies, such as pertaining to data restore, data retention, disaster recovery (DR), data backup, site replication, and/or other aspects of data management. Such data management policies might further be characterized by one or more data management objectives. For example, a data management objective for a data restore policy might be to minimize the cost of taking snapshots to facilitate restore points, given certain constraints such as a data management spending budget, a storage allocation maximum budget, a maximum data change between restore points, a recovery point objective (RPO), and/or other constraints.

Improvements can be brought to bear such as approaches to snapshot planning that address quantitative data management objectives in systems that exhibit highly varying storage IO patterns. For example, improvements might provide a user interface $156_1$ that goes beyond merely permitting a data manager (e.g., an IT administrator) to specify a static snapshot frequency (operation 172) so as to produce a static snapshot plan 124. As depicted in FIG. 1A, the static snapshot plan 124 might not consider the historical storage IO activity $122_1$. More specifically, the static snapshot plan 124 might comprise a set of fixed snapshot intervals 132 over a certain period of time (e.g., specified duration of the plan). When such a static plan is applied to a highly dynamic storage IO environment, such as represented by the actual changed data (e.g., actual Δ) over time shown associated with the static snapshot plan 124, certain intended objectives may not be satisfied.

For example, during periods of high storage IO activity resulting in large volumes of changed data, the fixed snapshot frequency may be too low such that a maximum changed data between snapshots constraint is exceeded (see exceeds data constraint region 134). As another example, during periods of low storage IO activity resulting in small volumes of changed data, the fixed snapshot frequency may be too high such that a snapshot cost optimum and/or constraint is exceeded (see exceeds optimum cost region 136). As shown, the static snapshot plan 124 might satisfy the intended and/or implicit snapshotting objectives and/or constraints for merely a small portion (see acceptable region 138) of the dynamic range of the storage IO activity. In some cases, the snapshot frequency specified by the data manager $160_1$ might not satisfy the snapshotting objectives and/or constraints for any portion of the storage IO activity dynamic range. For example, with certain approaches and or with certain user interfaces, the data manager might have only limited knowledge of and/or ability to discern the multivariate (e.g., cost, space, performance, data change levels, etc.) effects of choosing a certain snapshot frequency at the time the frequency is selected, resulting in a static snapshot plan that can be improved (e.g., so as to satisfy certain snapshotting objectives and/or constraints).

Figure 1B:
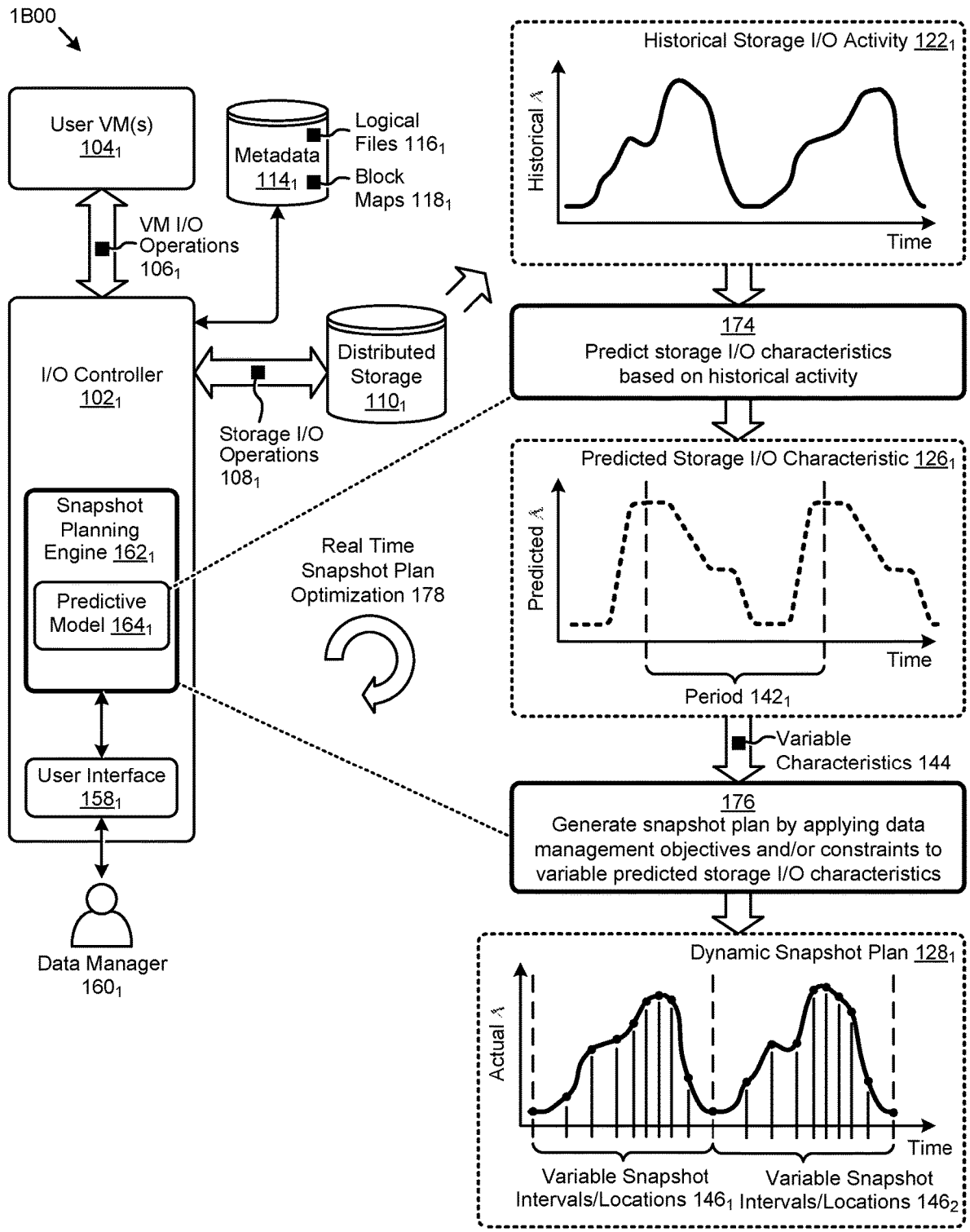
FIG. 1B illustrates a dynamic snapshot planning technique facilitated by systems for dynamic data snapshot management using predictive modeling, according to an embodiment.

Such technical problems attendant to determining a snapshot plan that satisfies one or more data management objectives (e.g., subject to one or more constraints) in a highly varying storage IO distributed storage environment can be addressed by the herein disclosed techniques as described in FIG. 1B.

FIG. 1B illustrates a dynamic snapshot planning technique 1B00 facilitated by systems for dynamic data snapshot management using predictive modeling. As an option, one or more variations of dynamic snapshot planning technique 1B00 or any aspect thereof may be implemented in the context of the architecture and functionality of the embodiments described herein. The dynamic snapshot planning technique 1B00 or any aspect thereof may be implemented in any environment.

The dynamic snapshot planning technique 1B00 illustrates one embodiment and resulting effects of the implementation of the herein disclosed techniques for dynamic data snapshot management using predictive modeling. The dynamic snapshot planning technique 1B00 depicts certain representative components of the distributed computing and storage system earlier described in FIG. 1A. Specifically, the IO controller $102_1$ is shown servicing the VM IO operations $106_1$ from the user VMs $104_1$ to perform various computing and/or storage operations, such as storage IO operations $108_1$. Also, the metadata $114_1$ is shown comprising logical files $116_1$ and block maps $118_1$ that can be used by the IO controller $102_1$ to facilitate data storage in a distributed storage $110_1$. The activities precipitated by the storage IO operations $108_1$ can further be represented by the historical storage IO activity $122_1$. Further, in some embodiments, the IO controller $102_1$ can comprise a snapshot planning engine $162_1$ used to facilitate the herein disclosed techniques.

Specifically, the snapshot planning engine $162_1$ can use a predictive model $164_1$ to predict certain storage IO characteristics based on attributes describing the historical storage IO activity $122_1$ (operation 174). One instance of such predicted storage IO characteristics might be a predicted storage IO characteristic $126_1$ showing a predicted amount of changed data (e.g., predicted Δ) varying over time. Other metrics (e.g., egress traffic, storage usage, CPU usage, snapshot activity, cumulative spend, etc.) and/or other parameters can comprise the predicted storage IO characteristics determined by the predictive model $164_1$.

In some cases, the predictive model $164_1$ is formed in part based on storage IO activity and/or other activity that has been observed over time during operation of one or more VMs. The predictive model $164_1$ might include precalculations (e.g., correlations) that relates observed activity pertaining to sets of multiple VMs or even multiple groupings of individual VMs or set of VMs.

In some cases, certain characteristics might be derived from the historical storage IO activity $122_1$. For example, a period $142_1$ might identify a certain pattern (e.g., seasonality) characterizing the predicted storage IO characteristic $126_1$. In some cases, lower orders of behavioral segments associated with the predicted storage IO characteristics can be identified. In highly dynamic storage IO environments, at least a portion of the predicted storage IO characteristics (e.g., metrics, parameters, behaviors, etc.) can be variable in time.

The dynamic snapshot planning technique 1B00 can use such a set of variable characteristics 144 determined by the predictive model $164_1$ to implement the herein disclosed techniques. Specifically, the snapshot planning engine $162_1$ can generate a snapshot plan by applying certain data management objectives to the variable characteristics 144 determined by the predictive model $164_1$ (operation 176). In some cases, the data management objectives can be subject to certain constraints. Specifically, a user interface $158_1$ might be provided to implement functions in the data manager $160_1$ so as to establish certain objectives and/or constraints pertaining to a snapshot strategy that can be applied to the variable characteristics 144 from the predictive model $164_1$, resulting in a dynamic snapshot plan $128_1$. The dynamic snapshot plan $128_1$ can comprise varying snapshot intervals and/or varying storage locations and/or other varying attributes that serve to optimize (e.g., minimize, maximize, etc.) the specified objectives subject to the various constraints provided.

For example, the dynamic snapshot plan $128_1$ can comprise a repeating set of snapshots having certain variable intervals and/or locations (e.g., variable snapshot intervals/locations $146_1$ and variable snapshot intervals/locations $146_2$) based on the periodicity (e.g., period $142_1$) and/or other characteristics derived by the predictive model $164_1$. As additional sets of attributes describing storage IO activity are electronically collected (e.g., continuously over the Internet), various updated instances of the dynamic snapshot plan $128_1$ can be automatically generated, facilitating a real time snapshot plan optimization (operation 178).

Strictly as examples, any of the heretofore-mentioned constraints might be based on input constraints (e.g., human-input data such as a data management spending budget, a storage allocation maximum budget, etc.). In other cases constraints might be based on derivations (e.g., a system-imposed maximum rate or quantity of egress traffic as derived from historical observations in combination with cost budget values, etc.) or observations (e.g., a system-imposed constraint on maximum quantity of data changes between restore points, etc.). In still other situations, a constraint on one variable can be derived from a constraint on another variable. As examples, the number, and/or start time, and/or frequency of snapshots taken might be derived from a constraint of the form, "do not exceed X % of CPU when taking snapshots", or "do not exceed X % of memory usage when taking snapshots".

As earlier mentioned, the problems attendant to determining a snapshot plan that satisfies one or more data management objectives addressed by the herein disclosed techniques are prevalent in distributed storage environments, and/or in systems that exhibit highly varying storage IO profiles. Such situations are shown and described as pertains to FIG. 2.

Figure 2:
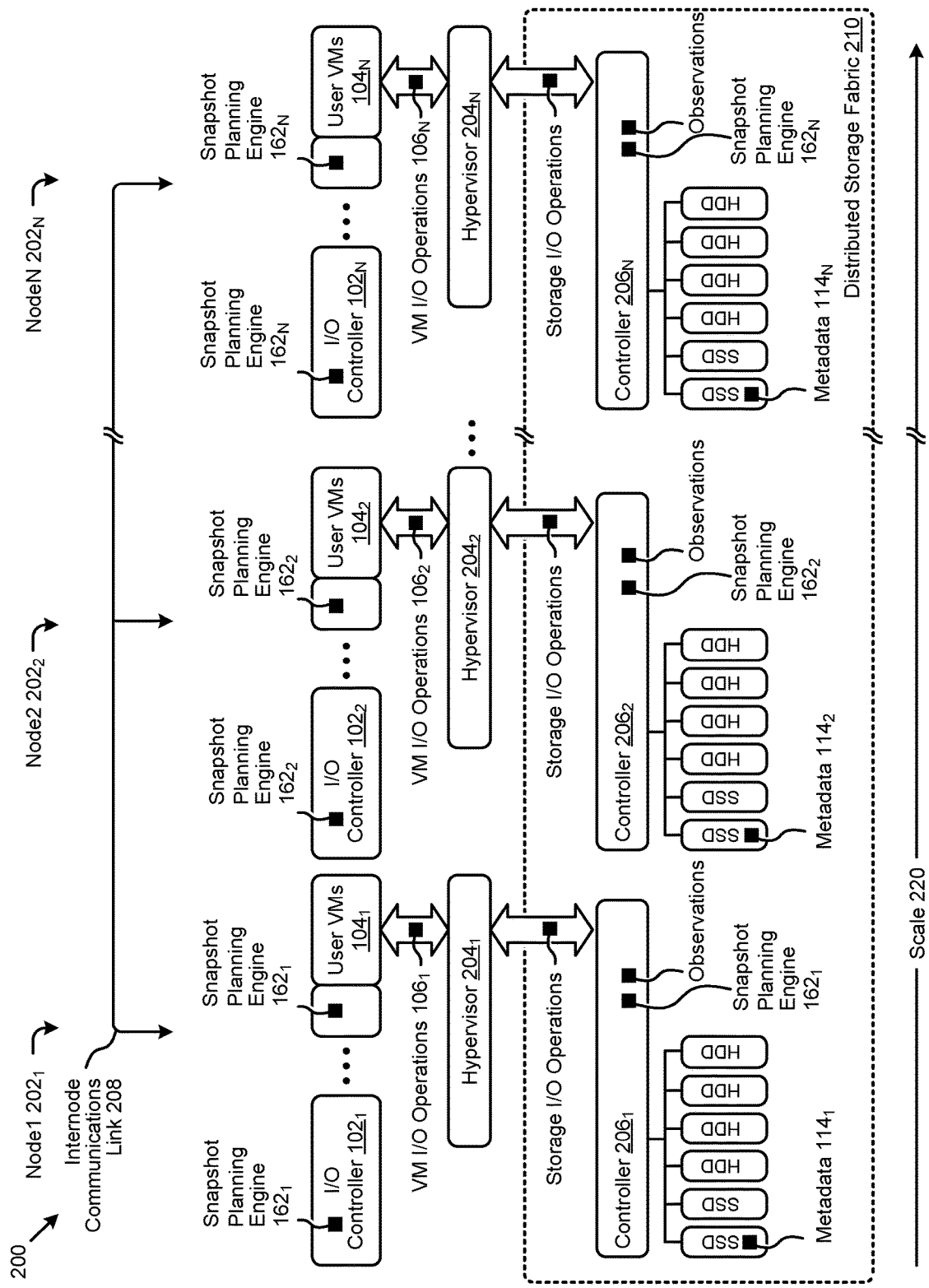
FIG. 2 depicts an environment in which embodiments of the present disclosure can operate.

FIG. 2 depicts an environment 200 in which embodiments of the present disclosure can operate. As an option, one or more variations of environment 200 or any aspect thereof may be implemented in the context of the architecture and functionality of the embodiments described herein. The environment 200 or any aspect thereof may be implemented in any environment.

As shown in the environment 200, a group of nodes (e.g., node1 $202_1$, node2 $202_2$, ..., nodeN $202_N$) can form a distributed storage and compute platform that comprises a distributed storage fabric 210. The distributed storage fabric 210 can appear to an instance of a hypervisor (e.g., hypervisor $204_1$, hypervisor $204_2$, ..., hypervisor $204_N$) and associated user virtual machines (e.g., user VMs $104_1$, user VMs $104_2$, ..., user VMs $104_N$, respectively) at each node as a centralized storage array, while the storage IO operations associated with the VM IO operations (e.g., VM IO operations $106_1$, VM IO operations $106_2$, ..., VM IO operations $106_N$, respectively) can be processed locally to each node by a local IO controller (e.g., IO controller $102_1$, IO controller $102_2$, ..., IO controller $102_N$, respectively) to provide the highest performance. The distributed storage fabric 210 can be scaled by adding more nodes (see scale 220) across one or more clusters and/or sites. In some distributed storage and compute platforms, the IO controllers across the various nodes comprising the platform can be provided and/or managed by a distributed storage vendor.

The hypervisor at each node can be an industry standard hypervisor (e.g., ESXi, KVM, Hyper-V, etc.). The IO controllers at each node can be controller VMs that process the VM IO operations for the respective hypervisor and user VMs. In some cases, the IO controllers can interface with respective storage access layers (e.g., storage access layer $206_1$, storage access layer $206_2$, ..., storage access layer $206_N$) which manage the local storage facilities and/or networked storage facilities. In some embodiments, instances of the snapshot planning engine (e.g., snapshot planning engine $162_1$, snapshot planning engine $162_2$, ..., snapshot planning engine $162_N$) can be included in a respective instance of the IO controller (e.g., IO controller $102_1$, IO controller $102_2$, ..., IO controller $102_N$, respectively), or in any virtual machine or container. Further, an instance of the earlier mentioned metadata (e.g., metadata $114_1$, metadata $114_2$, ..., metadata $114_N$) can be stored on one or more storage facilities accessible by each node.

The distributed storage fabric 210 can be configured to react to various workloads and/or allow heterogeneous node capabilities (e.g., compute heavy, storage heavy, etc.). For example, ensuring near uniform distribution of data across a cluster can be important when mixing nodes with larger storage capacities. In some cases, such disk balancing can be implemented as a scheduled process invoked by a local storage capacity usage having exceeded a certain threshold (e.g., 85% usage). When an imbalance is identified, certain data blocks can be designated for moving and associated storage IO operations (e.g., data move operations) can be distributed to nodes in the cluster (e.g., using the internode communications link 208). For example, certain user VMs might be running on a node that is writing more data than other nodes, resulting in a skew in the storage capacity usage for that node. In such cases, the disk balancing process can move the coldest data on the high usage node to other lower usage nodes in the cluster. In other cases, balancing within a node can occur. For example, data might be moved from an SSD device that is nearly fully used (e.g., 95%) to a lower tier local HDD device. In such cases, the data identified for migration can be based on the time of the last access (e.g., move colder data before hotter data).

The distributed storage fabric 210 can further be configured to support snapshots and/or clones of various data. While such snapshots and/or clones can leverage redirect-on-write algorithms, logical-to-physical block mapping, delta-based replications, and/or other techniques for improved efficiency, managing (e.g., planning) snapshots and/or clones in a highly active and/or varying storage IO environment can present challenges. For example, while certain snapshots can be executed with merely a block map copy in metadata (e.g., metadata $114_1$, metadata $114_2$, metadata $114_N$), taking snapshots that are not needed to satisfy certain objectives (e.g., RPO, maximum changed data between snapshots, etc.) can result in copy block map "bloat", which consumes metadata and other storage that could otherwise be used for other purposes. A single extraneous block map may not consume a large amount of storage, however sub-optimum snapshotting (e.g., due to a static snapshot frequency) can consume large amounts of storage and/or computing resources (e.g., for snapshot creation, garbage collection, network IO, etc.) across as many as thousands of nodes and/or across many clusters.

Figure 3:
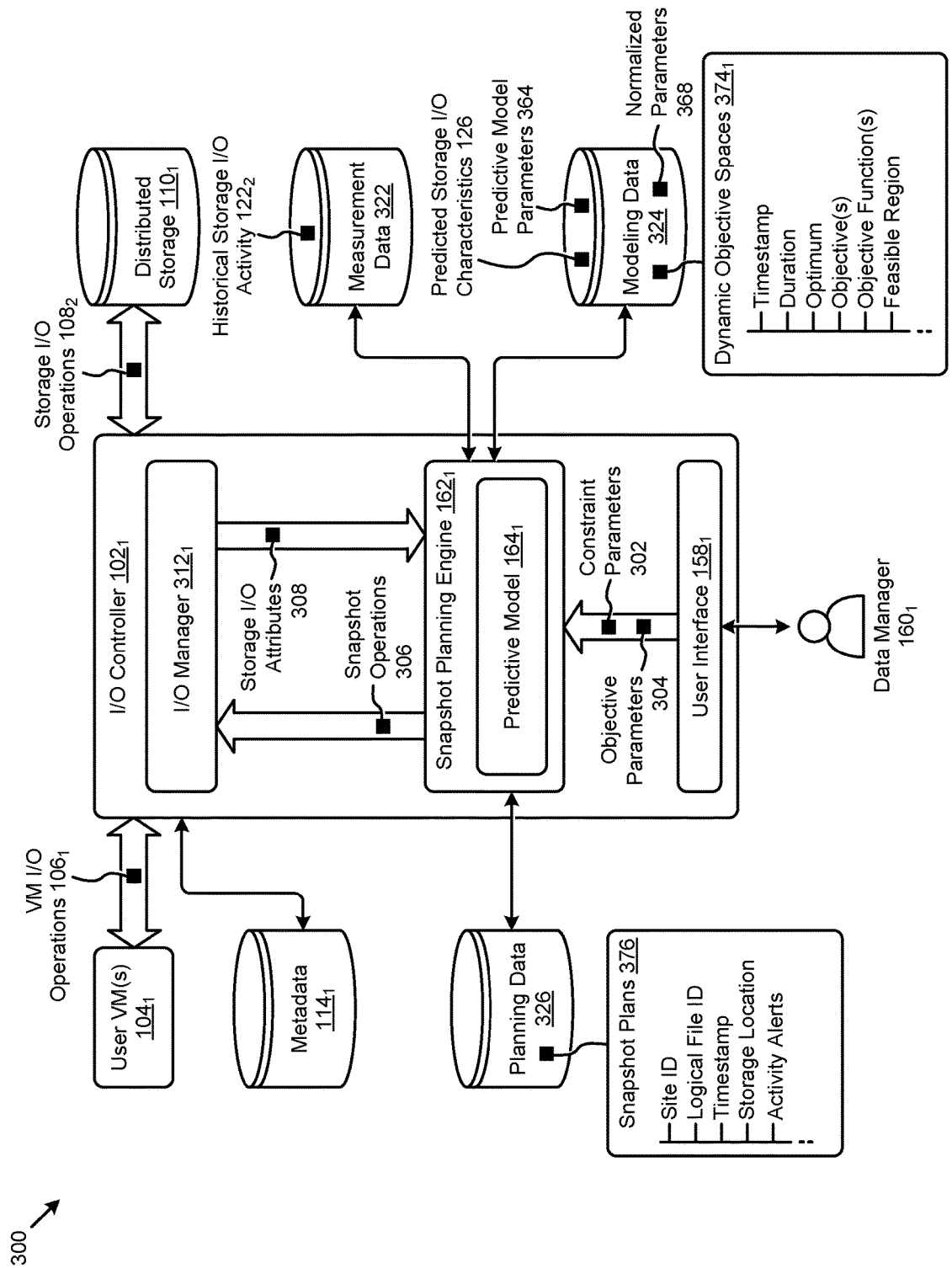
FIG. 3 is a block diagram of a subsystem for implementing dynamic data snapshot management using predictive modeling, according to an embodiment.

One embodiment of a subsystem for addressing the foregoing problems attendant to determining a snapshot plan that satisfies one or more data management objectives in a highly varying storage IO distributed storage environment is shown and described as pertaining to FIG. 3.

FIG. 3 is a block diagram of a subsystem 300 for implementing dynamic data snapshot management using predictive modeling. As an option, one or more variations of subsystem 300 or any aspect thereof may be implemented in the context of the architecture and functionality of the embodiments described herein. The subsystem 300 or any aspect thereof may be implemented in any environment.

The subsystem 300 presents one embodiment of components, data flows, data structures, and/or other aspects for implementing the herein disclosed techniques for dynamic data snapshot management using predictive modeling. Specifically, the subsystem 300 comprises the IO controller $102_1$ that services the VM IO operations $106_1$ from the user VMs $104_1$ to perform various computing and/or storage operations, such as storage IO operations $108_2$. As shown, in certain embodiments, the IO controller $102_1$ might comprise an IO manager $312_1$ to perform such services. Specifically, for example, the IO manager $312_1$ can use the metadata $114_1$ (e.g., logical files, block maps, etc.) and/or other information to generate the storage IO operations for managing the data stored in the distributed storage $110_1$ and/or other storage facilities.

To facilitate the herein disclosed techniques, the IO controller $102_1$ (e.g., controller VM, service VM, etc.) can comprise an instance of the snapshot planning engine $162_1$ to receive various instances of storage IO attributes 308 from the IO manager $312_1$ characterizing the storage IO activity. For example, the storage IO attributes 308 might describe, for certain periods of time, the amount of snapshot data written to the distributed storage $110_1$, the amount of snapshot block map metadata written, the amount of egress traffic, and/or other metrics.

In one or more embodiments, certain portions of the storage IO attributes 308 might describe one or more instances of the historical storage IO activity $122_2$ stored in a measurement data store (e.g., measurement data 322). The snapshot planning engine $162_1$ can use the storage IO attributes 308 and/or other information to form one or more instances of the predictive model $164_1$. The predictive model $164_1$ can be formed using various machine learning techniques. For example, a portion of a set of the storage IO attributes 308 can be used to train one or more instances of a learning model. A different portion of the set of the storage IO attributes 308 can then be used to validate the learning models. The processes of training and/or validating can be iterated until a selected instance of the learning models or a weighted combination of learning models behaves within target tolerances (e.g., with respect to predictive statistic metrics, descriptive statistics, significance tests, etc.).

In some cases, additional IO activity data can be collected to further train and/or validate the selected learning model and/or weighted combination of learning models. The resulting instance of the predictive model $164_1$ comprising the selected learning model and/or weighted combination of learning models can be described by a set of predictive model parameters 364 (e.g., input variables, output variables, equations, equation coefficients, mapping relationships, limits, constraints, etc.) that can be stored in a modeling data store (e.g., modeling data 324) for access by subsystem 300 (e.g., snapshot planning engine $162_1$) and/or other computing devices.

Specifically, the predictive model parameters 364 and associated predictive model $164_1$ can be used to determine one or more instances of predicted storage IO characteristics 126 based on various snapshot planning parameters received at the snapshot planning engine $162_1$. For example, the received snapshot planning parameters might indicate a desire to develop a snapshot plan for the next quarter such that a set of predicted storage IO characteristics 126 spanning the next three months might be determined using the predictive model $164_1$. In one or more embodiments, the predicted storage IO characteristics 126 can be stored in the modeling data 324. In some embodiments, a data manager $160_1$ can interact with the user interface $158_1$ of the IO controller $102_1$ to specify and/or select various snapshot planning parameters.

As an example, such snapshot planning parameters might comprise a set of objective parameters 304, a set of constraint parameters 302, and/or other parameters. Specifically, the objective parameters 304 and/or constraint parameters 302 might be derived from inputs selected by the data manager $160_1$ at the user interface $158_1$ to describe certain data management objectives (e.g., minimize snapshot cost, minimize data loss, etc.) subject to certain constraints (e.g., maximum snapshotting spend, storage capacity limit, etc.). In some embodiments, the snapshot planning parameters might be received by the snapshot planning engine $162_1$ from various computing resources in the distributed storage and compute platform. For example, an egress traffic and/or storage allocation monitoring system might electronically deliver periodic measurement updates to the snapshot planning engine $162_1$ to facilitate the herein disclosed techniques. In some cases, the snapshot planning parameters can be normalized to one or more metrics to produce a set of normalized parameters 368 for use by the herein disclosed techniques. For example, a snapshot minimization objective and a data loss minimization metric might be normalized to a respective cost metric to facilitate a comparison (e.g., trading off) of the two objectives. Further, normalization can be based on various aspects of the predicted storage IO characteristics 126. For example, a periodicity (e.g., repeating monthly pattern) in the predicted storage IO activity might be identified such that certain instances of the objective parameters 304 and/or constraint parameters 302 can be normalized to the identified period (e.g., spending per month, changed data per month, etc.). In some embodiments, the normalized parameters 368 can be stored in the modeling data 324.

The snapshot planning engine $162_1$ can use the received normalized and/or raw snapshot planning parameters (e.g., normalized parameters 368, objective parameters 304, constraint parameters 302, etc.), the predicted storage IO characteristics 126, and/or other information to generate one or more instances of dynamic objective spaces $374_1$. In some cases, each instance of the dynamic objective spaces $374_1$ can represent a respective portion (e.g., time period, behavioral segment, etc.) of the predicted storage IO characteristic.

Objective spaces cover (e.g., are the same set or a subset of) areas of a feasible region (e.g., comprising a feasible set, a search space, or a solution space, etc.) that includes a set of feasible points of an optimization problem (e.g., points that satisfy the problem's quantitative objectives given constraints, inequalities if any, equalities if any, etc.). In many cases, an objective space is defined as being the initial set of quantified candidate solutions to the given optimization problem that fall within a set of given constraints. Often a candidate set is narrowed down to a particular one or more chosen solutions or, in some cases, an optimal one or more solutions.

As shown, each instance of the dynamic objective spaces $374_1$ can comprise or derive from one or more objectives (e.g., comprising an objective vector) related by one or more objective functions having an optimum that is a member of a feasibility region. Such an optimum represents the vector of parameters (e.g., operating point) that optimizes (e.g., minimizes, maximizes, etc.) the given objectives subject to a set of constraints. In some cases, for example when the respective portion is a time period, an instance of the dynamic objective spaces $374_1$ can further be described by a timestamp and duration. Other attributes describing the dynamic objective spaces $374_1$ are possible. In one or more embodiments, the dynamic objective spaces $374_1$ and associated solutions (e.g., optima) can be determined by various multi-objective optimization algorithms operating at the snapshot planning engine $162_1$.

The dynamic objective spaces $374_1$ might be used to determine one or more instances of snapshot plans 376. Specifically, the optimum of a given instance of the dynamic object spaces $374_1$ can define certain snapshot plan attributes (e.g., snapshot interval, snapshot storage location, etc.) that best align to the objectives and/or constraints associated with the respective portion of the snapshot planning period. As shown, according to certain embodiments, such snapshot plan attributes describing the snapshot plans 376 can include a site identifier (e.g., site ID), a logical file identifier (e.g., logical file ID), a timestamp, a storage location, one or more activity alerts, and/or other attributes. In some embodiments, the snapshot plans 376 can be stored in a planning data store (e.g., planning data 326). The snapshot planning engine $162_1$ can use the information describing the snapshot plans 376 to generate one or more instances of snapshot operations 306 to issue to the IO manager $312_1$ for carrying out the snapshot plans 376.

The subsystem 300 depicted in FIG. 3 presents merely one partitioning. The specific example shown is purely exemplary, and other partitioning is reasonable. Further details pertaining to the herein disclosed techniques facilitated by such systems, subsystems, and/or partitionings are described throughout. Specifically, further details pertaining to generating the foregoing dynamic objective spaces are described in FIG. 4.

Figure 4:
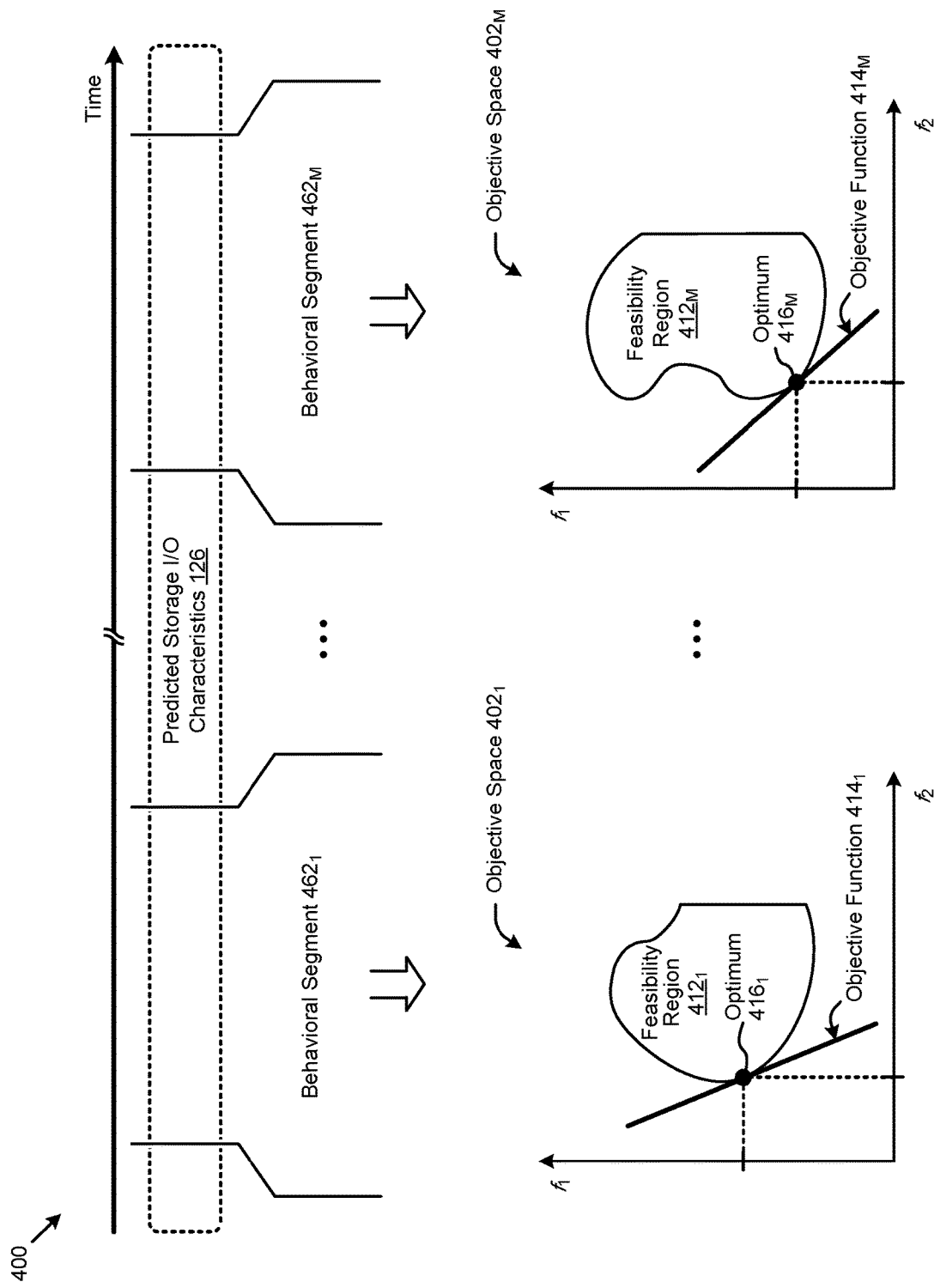
FIG. 4 presents a multi-objective optimization technique implemented by systems for dynamic data snapshot management using predictive modeling, according to some embodiments.

FIG. 4 presents a multi-objective optimization technique 400 implemented by systems for dynamic data snapshot management using predictive modeling. As an option, one or more variations of multi-objective optimization technique 400 or any aspect thereof may be implemented in the context of the architecture and functionality of the embodiments described herein. The multi-objective optimization technique 400 or any aspect thereof may be implemented in any environment.

A single objective optimization problem can be formulated by, $$\min[f(x)] \text{ for } x \in S \qquad [\text{EQ. 1}]$$

where $f$ is a scalar function and $S$ is the set of constraints that can be defined as, $$S=\{x \in R^m: h(x)=0, g(x) \geq 0, l \leq x \leq u\} \qquad [\text{EQ. 2}]$$

A multi-objective optimization problem can be formulated by, $$\min[F(x)] \text{ for } x \in S \qquad [\text{EQ. 3}]$$

where $F(x)=[f_1(x), f_2(x), \ldots, f_n(x)]$ for $n>1$.

The space that comprises the objective vector F and its feasible set C is called the objective space. The feasible set C, also called the feasibility region, can be defined by, $$C=\{y \in R^n: y=F(x), x \in S\} \qquad [\text{EQ. 4}]$$

For many multi-objective optimization problems, the objectives comprising the objective vector F are traded off against one another to identify an optimal vector $x^* \in S$. Specifically, in a multi-objective optimization, a Pareto optimal vector $x^*$ is to be determined. A vector $x^* \in S$ is said to be Pareto optimal for a multi-objective problem if all other vectors $x \in S$ have a higher value for at least one of the objectives $f_i$, or have the same value for all the objectives. Various attributes (e.g., weak, strict, local, inferior, non-inferior, non-dominated, etc.) describing such Pareto optima are possible. As the number of objective functions and/or constraints comprising an objective space increases, the complexity of quantifying the tradeoffs among the objectives to determine an optimum in turn increases. Such is the case, as described herein, when determining a snapshot plan that satisfies (e.g., optimizes) one or more data management objectives in a highly varying storage IO distributed storage environment. In such environments, for example, the data manager has a limited ability to know and/or discern the multivariate (e.g., cost, space, performance, data change levels, etc.) effects of a selected snapshot plan.

The herein disclosed techniques address such issues. Specifically, the foregoing multi-objective optimization concepts can be implemented in the multi-objective optimization technique 400 to facilitate dynamic data snapshot management using predictive modeling. More specifically, according to certain embodiments, the multi-objective optimization technique 400 depicts a set of predicted storage IO characteristics 126 determined by the herein disclosed techniques that can be partitioned into multiple behavioral segments (e.g., behavioral segment $462_1$, ..., behavioral segment $462_M$). In some cases, such segments can be time-based as shown. For example, behavioral segment $462_1$ might correspond to an observation time period (e.g., a historical time period, a current time period, etc.) characterized by a high volume of changed data, while behavioral segment $462_M$ might correspond to a time period characterized by a low volume of changed data. In this and other embodiments, the multi-objective optimization technique 400 serves for capturing a history of observations of any forms of storage IO activity over an arbitrary observation time period According to the herein disclosed techniques, an objective space (e.g., objective space $402_1$, . . . , objective space $402_M$) can be constructed for a respective behavioral segment (e.g., behavioral segment $462_1$, . . . , behavioral segment $462_M$, respectively). Such objective spaces can be referred to as "dynamic" since the objective spaces can vary over time and/or over other dimensions. The objective spaces shown represent a multi-objective optimization problem having two objectives (e.g., $f_1$ and $f_2$). For example, $f_1$ might correspond to a measure of data loss for a given period, and $f_2$ might correspond to a measure of the number of snapshots for the period. In two-dimensional space, the objective function (e.g., objective function $414_1$, . . . , objective function $414_M$) can be a line having a slope describing a relationship (e.g., weighted sum, etc.) between the objectives. As shown, the objective function can vary for the multiple behavioral segments (e.g., over time). The feasibility regions (e.g., feasibility region $412_1$, feasibility region $412_M$) can also vary for the multiple behavioral segments. For example, the feasibility regions might be derived, in part, from egress rates, storage costs, and/or other constraint parameters that can vary over time. For a given objective space, an optimum (e.g., optimum $416_1$, . . . , optimum $416_M$) can be determined. Such optima characterize a solution in a respective feasibility region that minimizes the objective function.

Figure 5A:
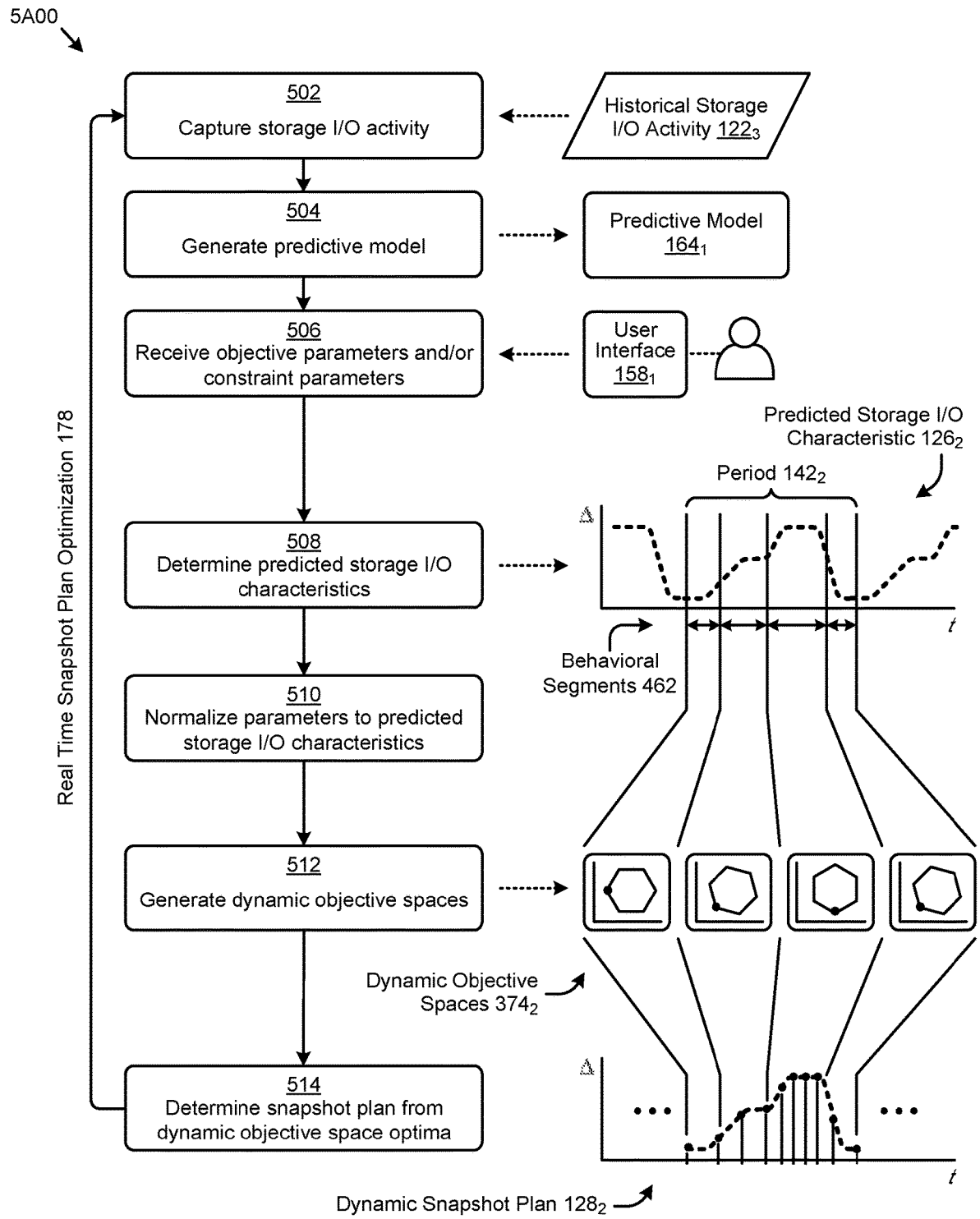
FIG. 5A illustrates a dynamic snapshot plan generation technique implemented by systems for dynamic data snapshot management using predictive modeling, according to some embodiments.

One embodiment of a technique for generating dynamic snapshot plans using the foregoing multi-objective optimization technique is described in FIG. 5A.

FIG. 5A illustrates a dynamic snapshot plan generation technique 5A00 implemented by systems for dynamic data snapshot management using predictive modeling. As an option, one or more variations of dynamic snapshot plan generation technique 5A00 or any aspect thereof may be implemented in the context of the architecture and functionality of the embodiments described herein. The dynamic snapshot plan generation technique 5A00 or any aspect thereof may be implemented in any environment.

The dynamic snapshot plan generation technique 5A00 presents one embodiment of certain steps and/or operations for generating snapshot plans according to the herein disclosed techniques. In one or more embodiments, the steps and underlying operations comprising the dynamic snapshot plan generation technique 5A00 can be executed by an instance of the snapshot planning engine $162_1$ described in FIG. 3. As shown, the dynamic snapshot plan generation technique 5A00 can commence with capturing storage IO activity (operation 502). For example, certain attributes describing a set of historical storage IO activity $122_3$ might be collected. Using the captured storage IO attributes and/or other information, a predictive model, such as predictive model $164_1$, can be generated (operation 504). The dynamic snapshot plan generation technique 5A00 can further receive objective parameters and/or constraint parameters (operation 506). For example, such parameters might be received from the user interface $158_1$. The generated predictive model can be used to determine certain predicted storage IO characteristics (operation 508). For example, the predictive model $164_1$ might be used to produce a predicted storage IO characteristic $126_2$ describing a changed data level varying in time. The predictive model might further identify a period $142_2$ and/or a set of behavioral segments 462 associated with the predicted storage IO characteristic $126_2$.

In some cases, certain parameters might be normalized based in part on the predicted storage IO characteristics (operation 510). For example, an annual spending budget constraint might be normalized to an instance of period $142_2$ corresponding to a 30-day period. In other cases, normalization based on the behavioral segments 462 and/or other metrics can be implemented to facilitate certain analyses and/or operations according to the herein disclosed techniques. The foregoing parameters, characteristics, and/or other information can be used to generate dynamic objective spaces (operation 512). For example, the dynamic objectives spaces $374_2$ corresponding to a respective one of the behavioral segments 462 might be generated. A dynamic snapshot plan (e.g., dynamic snapshot plan $128_2$) can be determined from the optima of the dynamic objective spaces (e.g., dynamic objective spaces $374_2$) (operation 514). For example, the optimum location or value (e.g., coordinates in a multi-dimensional space) for a given objective space might describe a snapshot cadence and/or snapshot storage location for a time period corresponding to a respective behavioral segment. Returning to capture (e.g., continuously over the Internet) additional sets of storage IO attributes to dynamically update the snapshot plan can facilitate a real time snapshot plan optimization (operation 178).

Figure 5B:
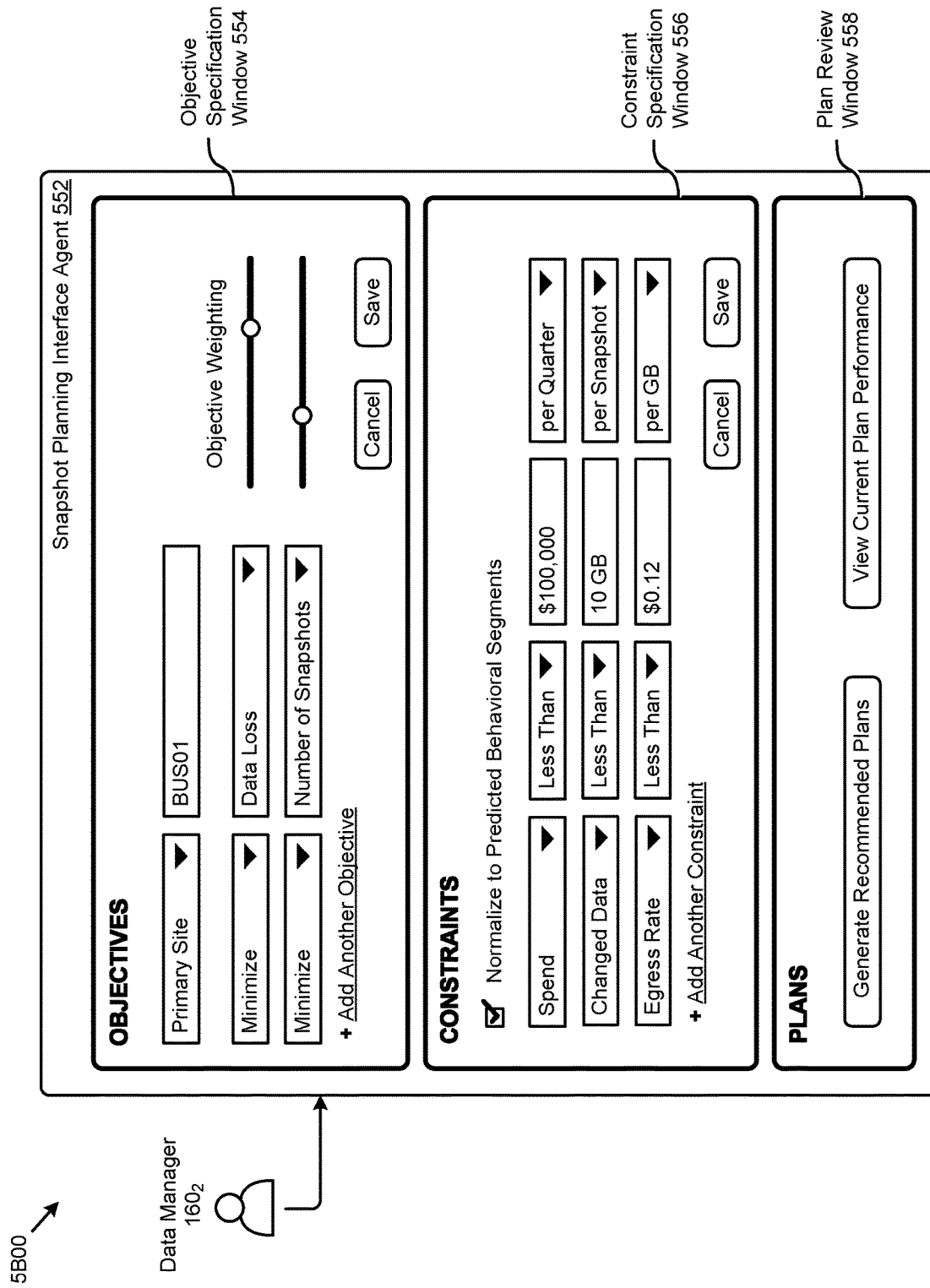
FIG. 5B presents a data manager interface implemented by systems for dynamic data snapshot management using predictive modeling, according to some embodiments.

One embodiment of the user interface $158_1$ to facilitate input of the objective parameters and/or constraint parameters, and/or to facilitate other operations pertaining to the herein disclosed techniques is described in FIG. 5B.

FIG. 5B presents a data manager interface 5B00 implemented by systems for dynamic data snapshot management using predictive modeling. As an option, one or more variations of data manager interface 5B00 or any aspect thereof may be implemented in the context of the architecture and functionality of the embodiments described herein. The data manager interface 5B00 or any aspect thereof may be implemented in any environment.

Specifically, the data manager interface 5B00 shown in FIG. 5B can be used by a data manager $160_2$ to manage certain aspects pertaining to the herein disclosed techniques for dynamic data snapshot management using predictive modeling. More specifically, the data manager interface 5B00 can comprise an objective specification window 554, a constraint specification window 556, and a plan review window 558 that is presented by a snapshot planning interface agent 552. As shown, the objective specification window 554 can present various input entry elements (e.g., dropdown selections, text boxes, etc.) through which the data manager $160_2$ can specify certain attributes associated with various objectives pertaining to a given snapshot strategy. For example, the data manager $160_2$ can specify objectives (e.g., from a list of available options) to "minimize" "data loss" and "minimize" the "number of snapshots" for a primary site "BUS01". The data manager $160_2$ can further specify a relative weighting of the specified objectives using slider controls.

The constraint specification window 556 can be used by the data manager $160_2$ to specify certain constraints to be applied to the selected objectives. For example, a "spend" of "less than" "$100,000" "per quarter" might be specified. Other constraints can be specified as shown. The data manager $160_2$ can further use the constraint specification window 556 to specify that parameters are to be normalized to predicted behavioral segments where appropriate. For example, the foregoing spending constraint might be normalized to a behavioral segment that is one week in duration (e.g., by dividing the $100,000 quarterly spending constraint by 13 weeks per quarter).

When the objectives and/or constraints have been specified and saved (e.g., by clicking the "Save" button), the plan review window 558 can be used by the data manager $160_2$ to perform various operations. For example, the data manager $160_2$ might click the "Generate Recommended Plans" to view a set of snapshot plans that best fit the specified objectives subject to the specified constraints. In some cases, various predicted metrics associated with the recommended snapshot plans can be presented to facilitate plan selection by the data manager $160_2$. The data manager $160_2$ might further use the plan review window 558 to "View Current Plan Performance". For example, the most recent measured performance of the current snapshot plan might be presented with the predicted performance of the recommended plans to further facilitate plan selection by the data manager $160_2$.

Additional Embodiments of the Disclosure

Additional Practical Application Examples

Figure 6A:
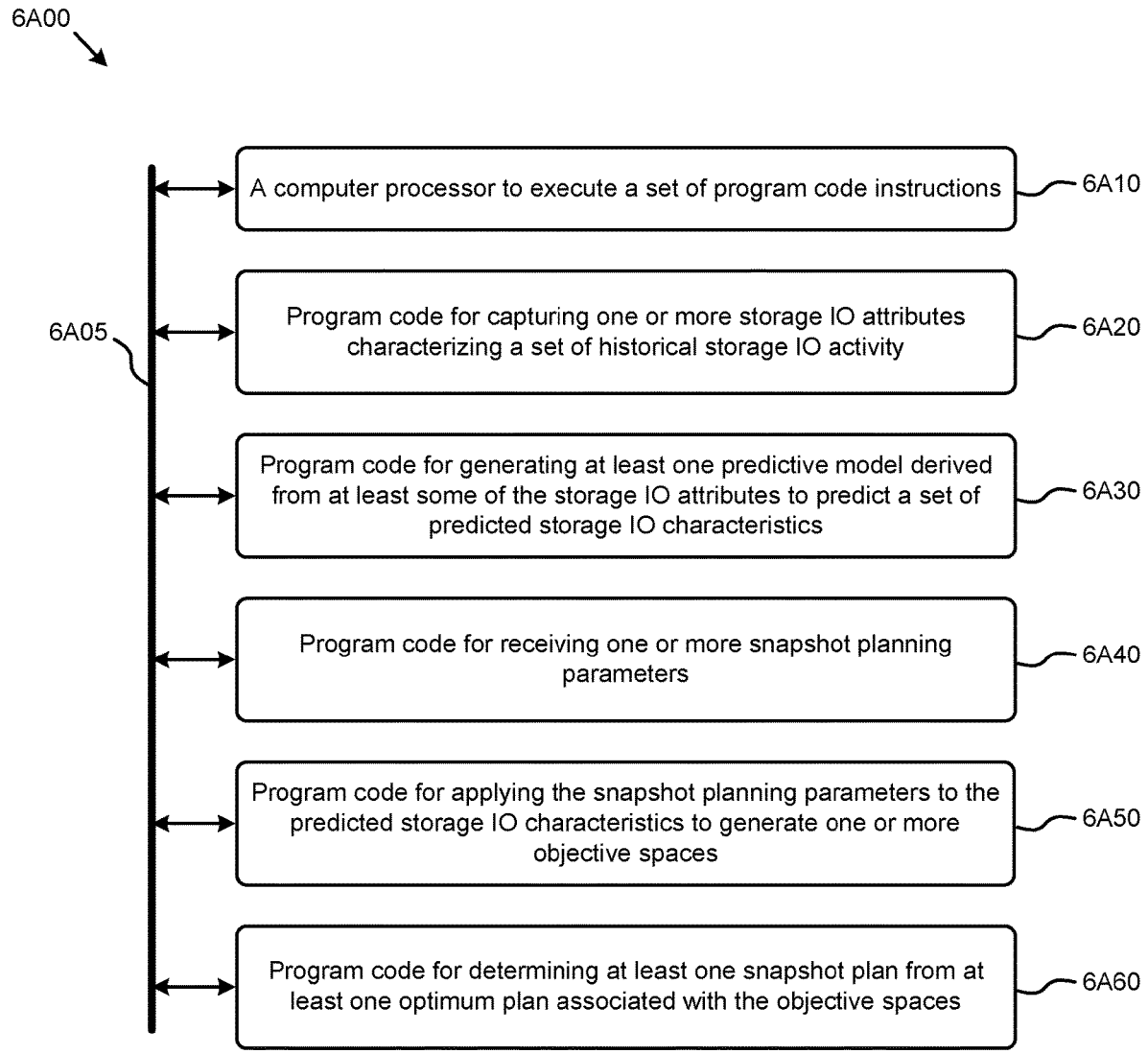
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising a computer processor to execute a set of program code instructions (module 6A10) and modules for accessing memory to hold program code instructions to perform: capturing one or more storage IO attributes characterizing a set of historical storage IO activity (module 6A20); generating at least one predictive model derived from at least some of the storage IO attributes to predict a set of predicted storage IO characteristics (module 6A30); receiving one or more snapshot planning parameters (module 6A40); applying the snapshot planning parameters to the predicted storage IO characteristics to generate one or more objective spaces (module 6A50); and determining at least one snapshot plan from at least one plan associated with the objective spaces (module 6A60).

Variations of the foregoing may include more or fewer of the foregoing modules and variations may perform more or fewer (or different) steps, and may use data elements in more or fewer (or different) operations. Strictly as examples, the embodiments discussed herein can include variations as follows:

- Variations that further comprise normalizing the snapshot planning parameters based on the predicted storage IO characteristics.
- Variations where the normalizing steps are based on a period described by the predicted storage IO characteristics.
- Variations that further comprise updating the snapshot plan responsive to receiving one or more additional sets of storage IO attributes over a network.
- Variations that further comprise generating one or more storage IO commands based on the snapshot plan (e.g., to schedule a snapshot to be taken, or to define a plurality of snapshot schedules for multiple future snapshots to be taken over an observation time period).
- Variations that further comprise providing a user interface to facilitate specification of the snapshot planning parameters.
- Variations where the snapshot planning parameters comprise at least one of, an objective value to minimize snapshot cost (e.g., dollars per month for snapshotting activities), and/or an objective value to minimize data loss (e.g., megabytes of lost data, kilobytes of lost data).
- Variations where the snapshot planning parameters comprise at least one of, a constraint value (e.g., a maximum dollar amount to quantify maximum snapshotting spending), and/or a constraint value to quantify a storage capacity limit (e.g., megabytes of used storage).
- Variations where the predicted storage IO characteristics describe behavioral segments (e.g., where the behavioral segments are associated with a respective one of the objective spaces).
- Variations where the objective spaces are characterized by an optimum value, an objective function, a feasibility region, a timestamp, or a duration.
- Variations where the snapshot plan is characterized by at least one of, a site identifier, a logical file identifier, a timestamp, a storage location, or one or more alerts.

Figure 6B:
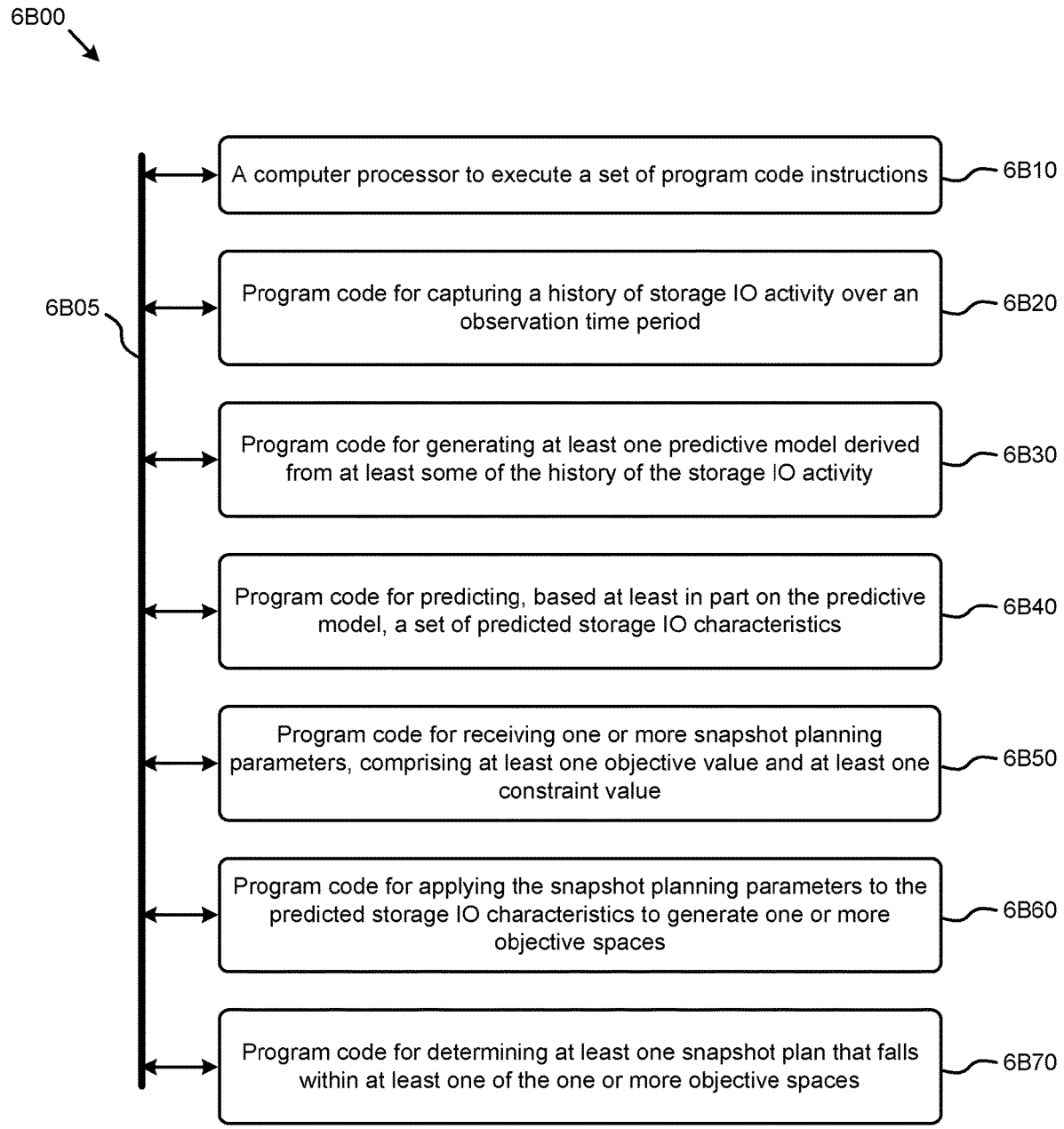

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising a computer processor to execute a set of program code instructions (module 6B10) and modules for accessing memory to hold program code instructions to perform: capturing a history of storage IO activity over an observation time period (module 6B20); generating at least one predictive model derived from at least some of the history of the storage IO activity (module 6B30); predicting, based at least in part on the predictive model, a set of predicted storage IO characteristics (module 6B40); receiving one or more snapshot planning parameters, comprising at least one objective value and at least one constraint value (module 6B50); applying the snapshot planning parameters to the predicted storage IO characteristics to generate one or more objective spaces (module 6B60); and determining at least one snapshot plan that falls within at least one of the one or more objective spaces (module 6B70).

System Architecture Overview

Additional System Architecture Examples

Figure 7A:
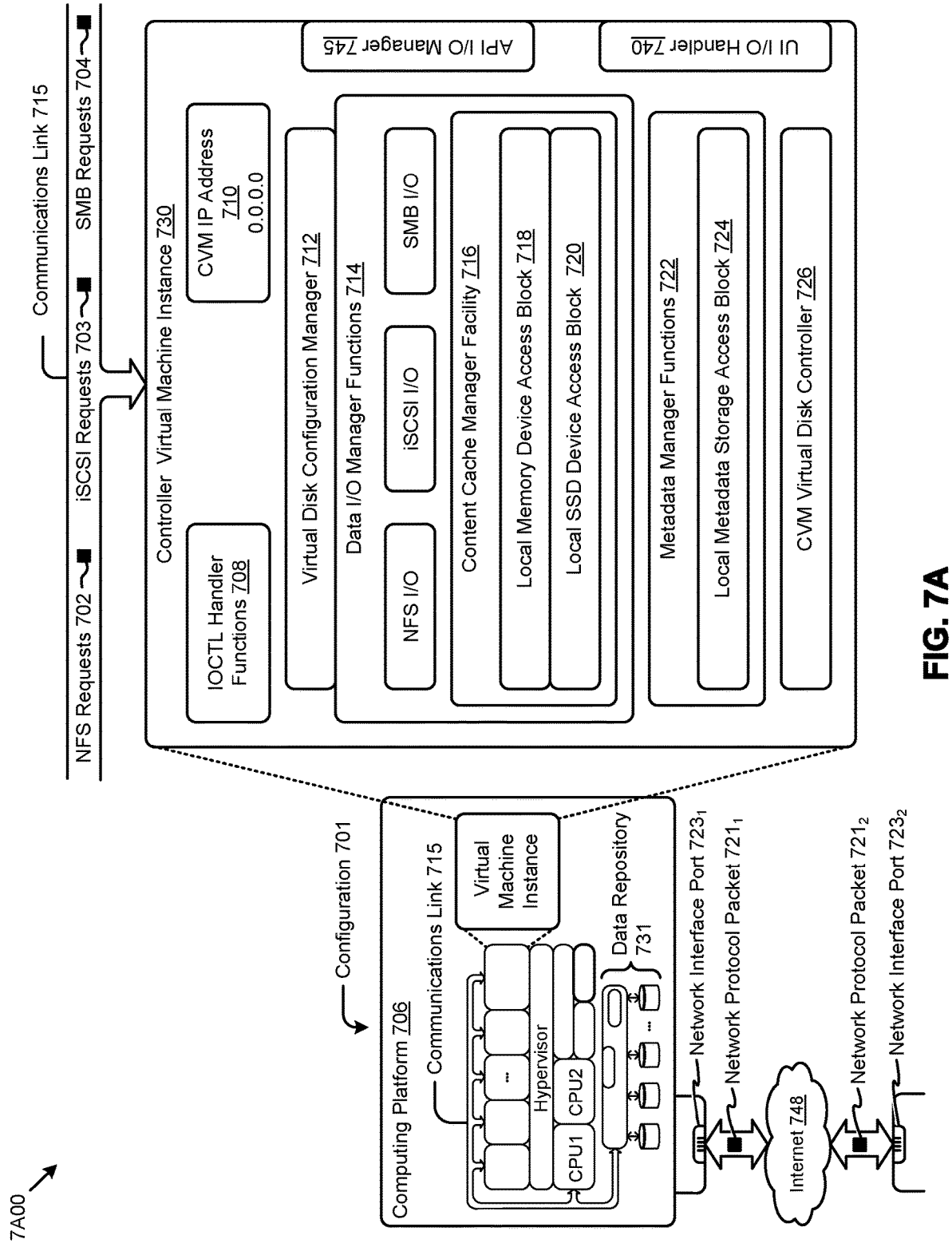
FIG. 7A and FIG. 7B depict architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block IO (input/output or IO) storage requests as network file system (NFS) requests in the form of NFS requests 702, and/or internet small computer storage interface (iSCSI) block IO requests in the form of iSCSI requests 703, and/or Samba file system requests (SMB) in the form of SMB requests 704. The controller virtual machine instance publishes and responds to an internet protocol (IP) address (e.g., see CVM IP address 710. Various forms of input and output (IO or IO) can be handled by one or more IO control handler functions (see IOCTL functions 708) that interface to other functions such as data IO manager functions 714, and/or metadata manager functions 722. As shown, the data IO manager functions can include communication with a virtual disk configuration manager 712, and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes any non-volatile storage medium, for example, solid state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731, can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of generating dynamic data snapshot schedules using predictive modeling.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic data snapshot management using predictive modeling). Such files or records can be brought into and/or stored in volatile or non-volatile memory.

Figure 7B:
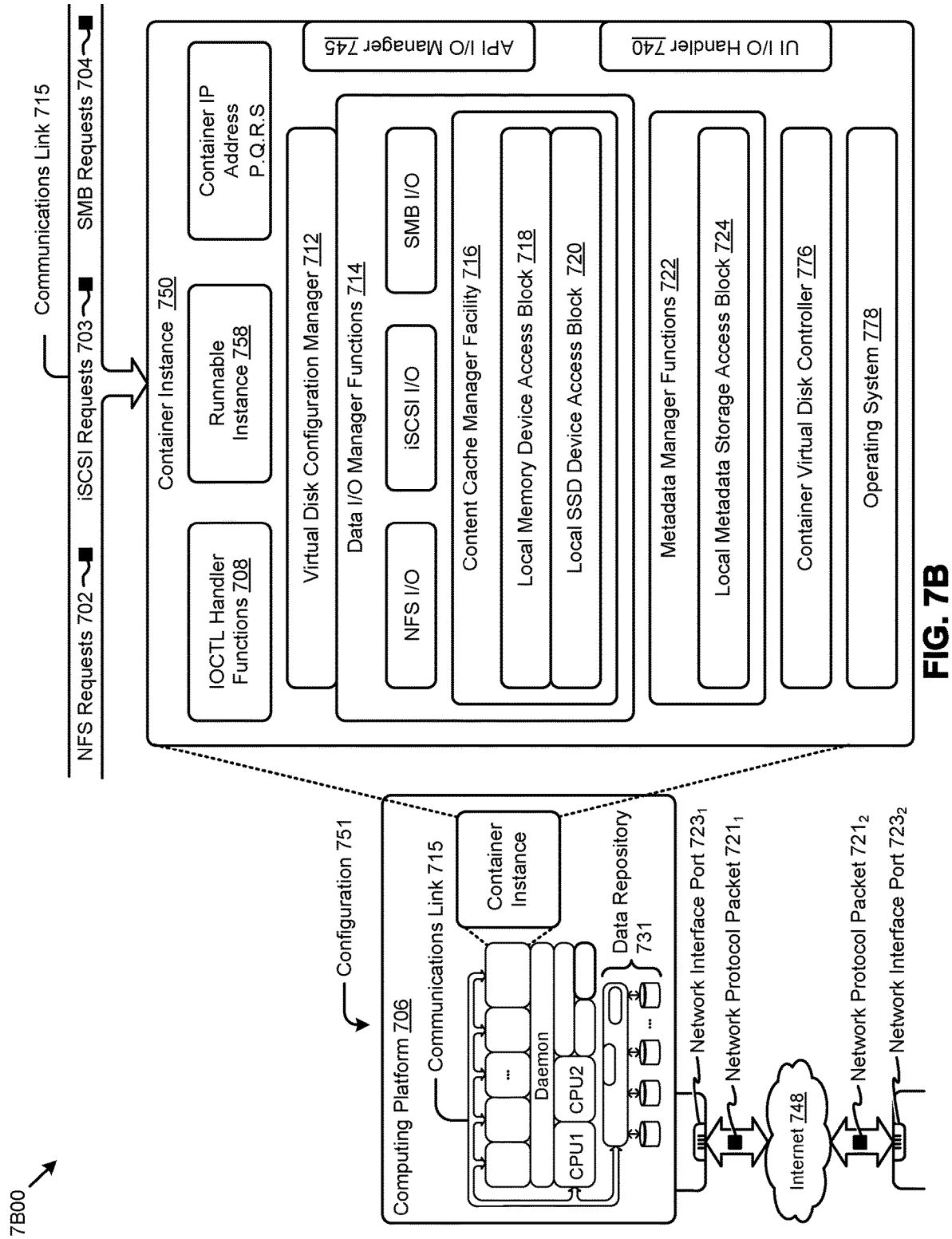

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 778, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the aforementioned CVM virtual disk controller 726, yet such a container virtual disk controller does not rely on a hypervisor or any particular operating system so as to perform its range of functions.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
    receiving data (input/output) IO of a distributed storage shared among multiple nodes in a distributed environment, wherein each respective node of the multiple nodes comprises a local storage; and
    dynamically updating a snapshot plan for the distributed storage at least by:
        monitoring data distribution uniformity across multiple local storages in the distributed storage;
        determining a predicted IO characteristic with at least a predictive model for a future time period and the data distribution uniformity; and
        dynamically updating the snapshot plan for capturing a snapshot of the multiple local storage during multiple segments of time in the future time period based at least in part on a change in the predicted IO characteristic during each of the multiple segments of time, and assigning a first frequency for snapshotting to a first of the multiple segments of time and a different frequency of snapshotting to a second of the multiple segments of time.

2. The method of claim 1, wherein the first of the multiple segments of time has a different temporal duration than the second of the multiple segments of time in which snapshots are respectively captured with the first and the second frequencies.

3. The method of claim 1, further comprising normalizing a snapshot planning parameter based at least in part on the predicted IO characteristic, the future time period, and one of the first or the second of the multiple segments of time in relation to the future time period.

4. The method of claim 1, wherein dynamically updating the snapshot plan further comprises assigning a first snapshot location in the distributed storage for the first of the multiple segments of time and assigning a second snapshot location in the distributed storage for the second of the multiple segments of time responsive to an additional storage IO attribute, wherein the first snapshot location is different from the second snapshot location.

5. The method of claim 1, wherein the first frequency or the second frequency for generating the snapshot is determined based at least in part on a first objective space for the first and a second objective space for the second of the multiple segments of time for the snapshot plan, and the first and second objective spaces respectively represent a respective portion of the predicted IO characteristic.

6. The method of claim 1, further comprising providing a user interface to facilitate specification of a snapshot planning parameter, a snapshot constraint, a snapshot objective, a snapshot strategy pertaining to a number of snapshots for a node, or any combination thereof.

7. The method of claim 1, further comprising moving a data block from a first local storage to a different local storage in the distributed storage in response to a skew in the data distribution uniformity in the distributed storage, wherein the data block comprises colder data on the first local storage.

8. The method of claim 1, further comprising generating an objective space at least by applying a snapshot planning parameter to the predicted IO characteristic, wherein the predicted IO characteristic describes the first or the second of the multiple segments of time, the first or the second of the multiple segments of time is associated with the objective space, and the objective space varies over a dimension that includes a temporal dimension.

9. The method of claim 1, further comprising determining the snapshot plan based at least in part upon an objective space that is generated based at least in part upon a snapshot planning parameter, wherein the objective space is characterized by at least one of an optimum value, an objective function, a feasibility region, a timestamp, a temporal duration, or any combination thereof.

10. The method of claim 1, wherein the snapshot plan is characterized by at least one of a site identifier, a logical file identifier, a timestamp, a storage location, an alert, or any combination thereof, and the snapshot is captured for the multiple local storages by using metadata that maps a logical storage entity to a corresponding physical location in the distributed storage.

11. A non-transitory computer readable medium having stored thereon a sequence of instructions which, when stored in memory and executed by a processor, causes the processor to perform a set of acts, the set of acts comprising:
receiving data (input/output) IO of a distributed storage shared among multiple nodes in a distributed environment, wherein each respective node of the multiple nodes comprises a local storage; and
dynamically updating a snapshot plan for the distributed storage at least by:
monitoring data distribution uniformity across multiple local storages in the distributed storage;
determining a predicted IO characteristic with at least a predictive model for a future time period and the data distribution uniformity;
dynamically updating the snapshot plan for capturing a snapshot of the multiple local storage during multiple segments of time in the future time period based at least in part on a change in the predicted IO characteristic during each of the multiple segments of time, and assigning a first frequency for snapshotting to a first of the multiple segments of time and a different frequency of snapshotting to a second of the multiple segments of time.

12. The non-transitory computer readable medium of claim 11, wherein the first of the multiple segments of time has a different temporal duration than the second of the multiple segments of time in which snapshots are respectively captured with the first and the second frequencies.

13. The non-transitory computer readable medium of claim 11, further comprising instructions which, when stored in the memory and executed by the processor, causes the processor to perform acts of normalizing a snapshot planning parameter based at least in part on the predicted IO characteristic, the future time period, and one of the first or the second of the multiple segments of time in relation to the future time period.

14. The non-transitory computer readable medium of claim 11, further comprising instructions which, when stored in the memory and executed by the processor, causes the processor to perform acts of assigning a first snapshot location in the distributed storage for the first of the multiple segments of time and assigning a second snapshot location in the distributed storage for the second of the multiple segments of time responsive to an additional storage IO attribute, wherein the first snapshot location is different from the second snapshot location.

15. The non-transitory computer readable medium of claim 11, wherein the first frequency or the second frequency for generating the snapshot is determined based at least in part on a first objective space for the first and a second objective space for the second of the multiple segments of time for the snapshot plan, and the first and second objective spaces respectively represent a respective portion of the predicted IO characteristic.

16. The non-transitory computer readable medium of claim 11, further comprising instructions which, when stored in the memory and executed by the processor, causes the processor to perform acts of providing a user interface to facilitate specification of a snapshot planning parameter, a snapshot constraint, a snapshot objective, a snapshot strategy pertaining to a number of snapshots for a node, or any combination thereof.

17. The non-transitory computer readable medium of claim 11, further comprising instructions which, when stored in the memory and executed by the processor, causes the processor to perform acts of moving a data block from a first local storage to a different local storage in the distributed storage in response to a skew in the data distribution uniformity in the distributed storage, wherein the data block comprises colder data on the first local storage.

18. The non-transitory computer readable medium of claim 11, further comprising instructions which, when stored in the memory and executed by the processor, causes the processor to perform acts of generating an objective space at least by applying a snapshot planning parameter to the predicted IO characteristic, wherein the predicted IO characteristic describes the first or the second of the multiple segments of time, the first or the second of the multiple segments of time is associated with the objective space, and the objective space varies over a dimension that includes a temporal dimension.

19. A system comprising:
a processor; and
a non-transitory storage medium having stored thereon a sequence of instructions which, when executed by the processor, causes the processor to perform a set of acts, the set of acts comprising:
receiving data (input/output) IO of a distributed storage shared among multiple nodes in a distributed environment, wherein each respective node of the multiple nodes comprises a local storage; and
dynamically updating a snapshot plan for the distributed storage at least by:
monitoring data distribution uniformity across multiple local storages in the distributed storage;
determining a predicted IO characteristic with a predictive model for a future time period and the data distribution uniformity; and dynamically updating the snapshot plan for capturing a snapshot of the multiple local storage during multiple segments of time in the future time period based at least in part on a change in the predicted IO characteristic during each of the multiple segments of time, and assigning a first frequency for snapshotting to a first of the multiple segments of time and a different frequency of snapshotting to a second of the multiple segments of time.

20. The system of claim 19, wherein dynamically updating the snapshot in the set of acts further comprises assigning a first snapshot location in the distributed storage for the first of the multiple segments of time and assigning a second snapshot location in the distributed storage for the second of the multiple segments of time, wherein the first snapshot location is different from the second snapshot location.

21. The system of claim 19, wherein the first of the multiple segments of time has a different temporal duration than the second of the multiple segments of time in which snapshots are respectively captured with the first and the second frequencies.

22. The system of claim 19, the set of acts further comprising generating an objective space at least by applying a snapshot planning parameter to the predicted IO characteristic, wherein the predicted IO characteristic describes the first or the second of the multiple segments of time, the first or the second of the multiple segments of time is associated with the objective space, and the objective space varies over a dimension that includes a temporal dimension.

* * * * *